(12) United States Patent
Einberg (10) Patent No.: US 11,967,194 B2
(45) Date of Patent: Apr. 23, 2024

(54) DETERMINING WHEN TO TRIGGER POSITIONING OF A PORTABLE KEY DEVICE

(71) Applicant: ASSA ABLOY AB, Stockholm (SE)

(72) Inventor: Fredrik Einberg, Huddinge (SE)

(73) Assignee: ASSA ABLOY AB, Stockholm (SE)

( * ) Notice: Subject to any disclaimer, the term of this patent is extended or adjusted under 35 U.S.C. 154(b) by 66 days.

(21) Appl. No.: 17/607,651

(22) PCT Filed: May 18, 2020

(86) PCT No.: PCT/EP2020/063783
§ 371 (c)(1),
(2) Date: Oct. 29, 2021

(87) PCT Pub. No.: WO2020/234223
PCT Pub. Date: Nov. 26, 2020

(65) Prior Publication Data
US 2022/0222996 A1    Jul. 14, 2022

(30) Foreign Application Priority Data
May 21, 2019 (SE) .................................. 1950603-9

(51) Int. Cl.
*G07C 9/28* (2020.01)
*G06N 3/08* (2023.01)
(Continued)

(52) U.S. Cl.
CPC ................. *G07C 9/28* (2020.01); *G06N 3/08* (2013.01); *G07C 9/00309* (2013.01); *G07C 9/22* (2020.01);
(Continued)

(58) Field of Classification Search
CPC ........ G07C 9/28; G07C 9/00309; G07C 9/22; G07C 2009/00769
See application file for complete search history.

(56) References Cited

U.S. PATENT DOCUMENTS

| 9,886,805 B1 | 2/2018 | Bianchi, III et al. |
| 2003/0090387 A1 | 5/2003 | Lestienne et al. |

(Continued)

FOREIGN PATENT DOCUMENTS

| DE | 10106400 | 8/2002 |
| DE | 102017204078 | 9/2018 |

(Continued)

OTHER PUBLICATIONS

Official Action for Sweden Patent Application No. 1950603-9, dated Dec. 11, 2019, 10 pages.
(Continued)

*Primary Examiner* — Nabil H Syed
(74) *Attorney, Agent, or Firm* — Schwegman Lundberg & Woessner, P.A.

(57) ABSTRACT

It is provided a method for determining when to trigger positioning of a portable key device used in access control for an electronic lock controlling access to a restricted physical space. The method is performed in a positioning determiner and comprises the steps of: obtaining movement data from a motion sensor of the portable key device, the movement data indicating movement of the portable key device; determining when the movement data indicates a stop in motion of the key device; and triggering positioning of the portable key device when a stop in motion of the key device has been determined.

17 Claims, 4 Drawing Sheets

(51) Int. Cl.
*G07C 9/00* (2020.01)
*G07C 9/22* (2020.01)

(52) U.S. Cl.
CPC .............. *G07C 2009/00769* (2013.01); *G07C 2209/08* (2013.01); *G07C 2209/63* (2013.01)

(56) References Cited

U.S. PATENT DOCUMENTS

| | | | |
|---|---|---|---|
| 2014/0315546 A1 | 10/2014 | Chen et al. | |
| 2014/0375423 A1 | 12/2014 | Lagabe | |
| 2015/0329121 A1 | 11/2015 | Lim et al. | |
| 2017/0342750 A1 | 11/2017 | Hiramine | |
| 2019/0135229 A1* | 5/2019 | Ledvina | H04W 12/06 |
| 2019/0176759 A1* | 6/2019 | Heinrich | B60R 25/245 |
| 2020/0130644 A1* | 4/2020 | Heinrich | B60R 25/257 |
| 2020/0349786 A1* | 11/2020 | Ho | G06V 40/172 |
| 2021/0035398 A1* | 2/2021 | Tiwari | G06F 3/017 |

FOREIGN PATENT DOCUMENTS

| | | |
|---|---|---|
| EP | 3147868 | 3/2017 |
| EP | 3477600 | 5/2019 |
| WO | WO 2017/017525 | 2/2017 |
| WO | WO 2019/068021 | 4/2019 |

OTHER PUBLICATIONS

International Search Report and Written Opinion for International (PCT) Patent Application No. PCT/EP2020/063783, dated Aug. 24, 2020, 10 pages.
International Preliminary Report on Patentability for International (PCT) Patent Application No. PCT/EP2020/063783, dated Sep. 22, 2021, 7 pages.
Second Written Opinion for International (PCT) Patent Application No. PCT/EP2020/063783, dated Apr. 28, 2021, 7 pages.

* cited by examiner

DETERMINING WHEN TO TRIGGER POSITIONING OF A PORTABLE KEY DEVICE

CROSS REFERENCE TO RELATED APPLICATIONS

This application is a national stage application under 35 U.S.C. 371 and claims the benefit of PCT Application No. PCT/EP2020/063783 having an international filing date of May 18, 2020, which designated the United States, which PCT application claimed the benefit of Sweden Patent Application No. 1950603-9 filed May 21, 2019, the disclosure of each of which are incorporated herein by reference.

TECHNICAL FIELD

The invention relates to a method, a portable key device, a computer program and a computer program product for determining when to trigger positioning of a portable key device.

BACKGROUND

Locks and keys are evolving from the traditional pure mechanical locks. These days, there are wireless interfaces for electronic locks, e.g. by interacting with a portable key device. For instance, Radio Frequency Identification (RFID) has been used as the wireless interface.

When RFID is used, the user needs to present the portable key device in close proximity to a reader connected to the lock. Moreover, RFID requires a relatively large antenna in the reader by the lock and uses a large amount of energy. Significantly, RFID requires a user to actively take out the portable key device (e.g. RFID card or NFC (Near Field Communication) enabled smartphone) and bring it to be within centimetres of the lock. This is inconvenient and potentially insecure, since it is easier for an attacker to steal the portable key device when it is presented to the lock for the access control.

By using other short-range wireless communication with slightly longer communication range, e.g. Bluetooth Low Energy (BLE), Bluetooth or Ultra High Frequency (UHF), the portable key device can stay in a pocket or handbag and still be used for access control. However, the increased range also causes new problems. One problem which occurs if the lock unlocks whenever an authorised portable key device is within range, is that when a person on the inside of an electronic lock walks past the electronic lock, the electronic lock could unintentionally be unlocked and anyone could gain access to the restricted physical space.

By determining the position of the portable key device in relation to the lock, it can be determined if the portable key device (and thus the user) is on the inside or the outside. In this way, the automatic access control can still be used, but a person walking past on the inside will not trigger the unlock procedure.

However, many positioning technologies with suitable accuracy, such as ultra-wideband (UWB), use a significant amount of energy, which is a real problem not only for battery powered portable key devices but also for battery powered electronic locks.

SUMMARY

It is an object of embodiments presented herein to provide a way to determine when to trigger positioning of a portable key device which is used in access control to a physical space controlled by an electronic lock. According to a first aspect, it is provided a method for determining when to trigger positioning of a portable key device used in access control for an electronic lock controlling access to a restricted physical space. The method is performed in a positioning determiner and comprises the steps of: obtaining movement data from a motion sensor of the portable key device, the movement data indicating movement of the portable key device; determining when the movement data indicates a stop in motion of the key device; and triggering positioning of the portable key device when a stop in motion of the key device has been determined.

The method may further comprise the step of: refraining from positioning the portable key device whenever the movement data fails to indicate a stop in motion of the key device.

The method may further comprise the step, prior to the step of obtaining movement data, of: authenticating the portable key device with the electronic lock using a first communication protocol.

The positioning may be based on communication over a second communication protocol, the second communication protocol being different from the first communication protocol.

The step of triggering positioning may comprise triggering positioning to occur repetitively during a certain time period.

The step of determining when the movement data indicates a stop in motion may comprise determining the movement data indicating a stop in motion when an activity level, based on the movement data, falls below a threshold.

The method according to any one of the preceding claims, may further comprise the step, prior to the step of obtaining movement data, of: training a machine learning model based on movement data and being input data and stop in motion being expected output; in which case the step of determining when the movement data indicates a stop in motion is based on the machine learning model.

The step of determining when the movement data indicates a stop in motion may comprise determining the movement data indicating a stop in motion when the movement data indicates that velocity is about zero.

The step of triggering positioning may comprise triggering positioning using a positioning module being fixed in relation to the electronic lock.

According to a second aspect, it is provided a positioning determiner for determining when to trigger positioning of a portable key device used in access control for an electronic lock controlling access to a restricted physical space. The positioning determiner comprises: a processor; and a memory storing instructions that, when executed by the processor, cause the positioning determiner to: obtain movement data from a motion sensor of a portable key device, the movement data indicating movement of the portable key device; determine when the movement data indicates a stop in motion of the key device; and trigger positioning of the portable key device when a stop in motion of the key device has been determined.

The positioning determiner may further comprise instructions that cause the positioning determiner to: refrain from positioning the portable key device whenever the movement data fails to indicate a stop in motion of the key device.

The positioning determiner may further comprise instructions that, when executed by the processor prior to the instructions of obtaining movement data, cause the positioning determiner to: authenticate the portable key device with the electronic lock using a first communication protocol.

The positioning may be based on communication over a second communication protocol, the second communication protocol being different from the first communication protocol.

The instructions to trigger positioning may comprise instructions that, when executed by the processor, cause the positioning determiner to trigger positioning to occur repetitively during a certain time period.

The instructions to determine when the movement data indicates a stop in motion may comprise instructions that, when executed by the processor, cause the positioning determiner to determine the movement data indicating a stop in motion when an activity level, based on the movement data, falls below a threshold.

The positioning determiner may further comprise instructions that, when executed by the processor prior to the instructions to obtain movement data, cause the positioning determiner to: train a machine learning model based on movement data and being input data and stop in motion being expected output; in which case the instructions to determine when the movement data indicates a stop in motion is based on the machine learning model.

The instructions to determine when the movement data indicates a stop in motion may comprise instructions that, when executed by the processor, cause the positioning determiner to determine the movement data indicating a stop in motion when the movement data indicates that velocity is about zero.

The instructions to trigger positioning may comprise instructions that, when executed by the processor, cause the positioning determiner to trigger positioning using a positioning module being fixed in relation to the electronic lock.

According to a third aspect, it is provided a computer program for determining when to trigger positioning of a portable key device used in access control for an electronic lock controlling access to a restricted physical space. The computer program comprises computer program code which, when run on a positioning determiner causes the positioning determiner to: obtain movement data from a motion sensor of a portable key device, the movement data indicating movement of the portable key device; determine when the movement data indicates a stop in motion of the key device; and trigger positioning of the portable key device when a stop in motion of the key device has been determined.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

According to embodiments presented herein, movement data from a motion sensor of a portable key device is used to determine when there is a stop in motion of the portable key device. When the stop is determined, the positioning is triggered. In this way, energy consumption for the positioning is kept low, while still providing great responsiveness. This is better than polling of positioning, where it is difficult to find a balance of sufficiently responsiveness (requiring a high polling frequency) and energy efficiency (requiring a low polling frequency). Moreover, even with a low error rate in determining position to be on the insider or the outside, with polling there will be a great number of positionings over time, leading to real risk of incorrect determination of the portable key device being on the inside or the outside.

While the positioning triggered each time the portable key device stops may not result in granted access every time (since the user can be on the inside), the number of times positioning occurs is still less than if polling is used (thus using less energy) and is more responsive than if polling is used, since the positioning is triggered whenever the portable key device stops.

Figure 1:
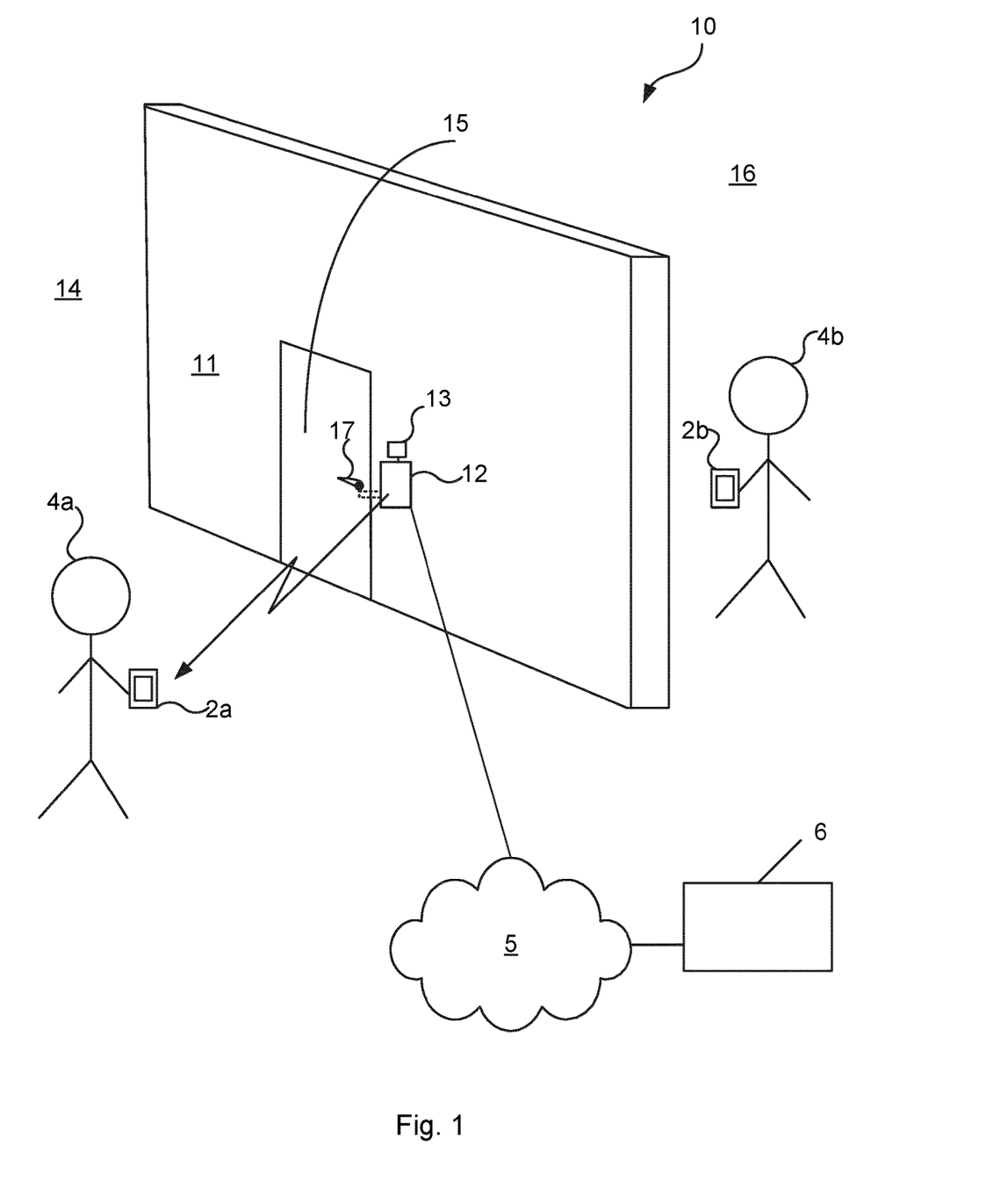
FIG. 1 is a schematic diagram showing an electronics access control system being an environment in which embodiments presented herein can be applied.

FIG. 1 is a schematic diagram showing an electronics access control system 10 being an environment in which embodiments presented herein can be applied. Access to a physical space 16 is restricted by a physical barrier 15, which is selectively unlockable. The physical barrier 15 stands between the restricted physical space 16 and an accessible physical space 14. Note that the accessible physical space 14 can be a restricted physical space in itself, but in relation to this particular physical barrier 15, the accessible physical space 14 is accessible. In other words, the restricted physical space 16 is inside the physical barrier 15 and the accessible physical space 14 is outside the physical barrier 15. The barrier 15 can be a door, gate, hatch, window, drawer, etc. A handle 17 is provided to allow opening of the barrier 15, once unlocked. In order to unlock or lock the barrier 15, an electronic lock 12 is provided. The electronic lock 12 can be in an unlocked state or locked state. The barrier 15 is provided in a surrounding fixed structure 11, such as a wall, fence or vehicle.

A positioning module 13 is connected to the electronic lock 12 or forms part of the electronic lock 12. The positioning module 13 is used to determine the position of any portable key devices, such as a first portable key device 2a and a second portable key device 2b in the vicinity of the electronic lock 12. The position is determined in relation to the positioning module 13 and can e.g. be based on UWB (ultra-wideband) technology. UWB provides great accuracy of device positioning but at the cost of relatively large energy usage. Alternatively or additionally, the positioning module 13 can be based on other positioning technologies.

The electronic lock 12 is able to receive and send signals from/to portable key devices 2a-b over a communication channel which may be a short-range wireless interface. Optionally, the electronic lock 12 comprises a separate unit, also known as an access control reader, for communicating with the portable key devices 2a-b and evaluating access. In this example, there is a first portable key device 2a and a second portable key device 2b. The portable key devices 2a-b are implemented using any suitable device which is portable by a user and which can be used by the electronic lock 12 to evaluate whether to grant access or not by communicating over the communication channel. The portable key devices can comprise digital cryptographic keys for electronic authentication.

The portable key devices 2a-b are typically carried or worn by a user and may be implemented as a smart phone, wearable device, key fob, etc. The portable key devices 2a-b include a movement sensor, which can be implemented e.g. as an accelerometer and/or gyro. In this example, the first portable key device 2a is carried by a first user 4a and the second portable key device 2b is carried by a second user 4b. The first user 4a and the first portable key device 2a are located in the accessible physical space 14 (i.e. outside the electronic lock 12) and the second user 4b and the second portable key device 2b are located in the restricted physical space 16 (i.e. inside the electronic lock 12).

The short-range wireless interface between the portable key devices 2a-b and the electronic lock 12 is a radio frequency wireless interface and could e.g. employ Bluetooth Low Energy (BLE), Bluetooth, ZigBee, Radio Frequency Identification (RFID), any of the IEEE 802.11 standards, any of the IEEE 802.15 standards, wireless Universal Serial Bus (USB), etc. Using the communication channel, the portable key devices 2a-b can be authenticated and authorisation determination (access control) can be performed by the electronic lock 12 or the access control reader. The communication over the short-range wireless interface can be encrypted.

When the access control by the electronic lock 12 results in granted access, the electronic lock 12 is set in an unlocked state. When the electronic lock 12 is in the unlocked state, the barrier 15 can be opened and when the electronic lock 12 is in a locked state, the barrier 15 cannot be opened. In this way, access to a closed space 16 is controlled by the electronic lock 12. It is to be noted that the electronic lock 12 can be mounted in the fixed structure 11 by the physical barrier 15 (as shown) or in the physical barrier 15 itself (not shown).

The electronic lock 12 can perform an access control for any portable key device 2a-b presented to it. However, according to embodiments presented herein, automatic access control is only performed after positioning of the portable key device 2a indicates that the portable key device 2a is on the outside, i.e. the accessible physical space 14. The reason for this is that if access control is performed by the electronic lock 12 whenever a portable key device is within communicable range, the second portable key device 2b in the restricted physical space 16 (i.e. on the inside) can result in the electronic lock 12 unlocking when the second user 5 walks by, without intending to unlock the electronic lock 12 to open the barrier. An unauthorised person could then open the barrier 15 and gain access to the restricted physical space 16.

The electronic lock optionally contains communication capabilities to connect to a server 6 for the electronics access control system 10 via a network 5. The network can be a wide area network, such as the Internet, to which the portable key devices 2a-b can connect e.g. via WiFi (e.g. any of the IEEE 802.11x standards) or a cellular network, e.g. LTE (Long Term Evolution), next generation mobile networks (fifth generation, 5G), UMTS (Universal Mobile Telecommunications System) utilising W-CDMA (Wideband Code Division Multiplex), etc.

Figure 2A:
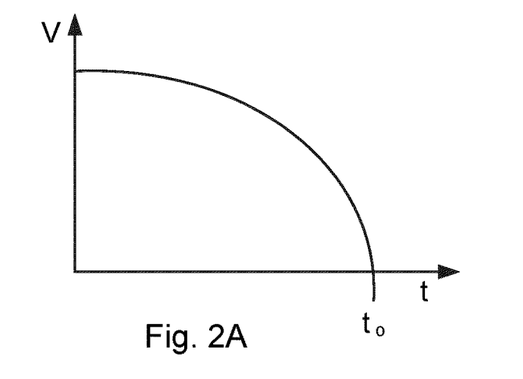
FIGS. 2A-B are schematic graphs illustrating velocity and acceleration when a user carrying a portable key device stops.
Figure 2B:
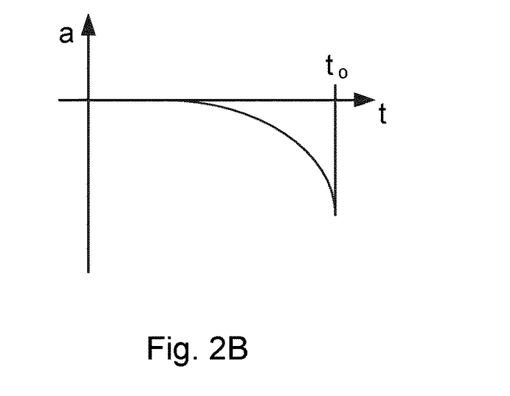

FIGS. 2A-B are schematic graphs illustrating velocity and acceleration when a user carrying a portable key device stops. In this example, a user walks and approaches an electronic lock, until the person stops at time $t_0$.

In FIG. 2A, a velocity v is shown over time. The velocity v is estimated using a motion sensor in the first portable key device 2a of FIG. 1. The velocity v can e.g. be obtained by integrating acceleration measurements over time. As known in the art, due to noisy measurements, the actual velocity can vary from the velocity v estimated using the acceleration measurements.

At time $t_0$, the velocity is (about) zero, indicating that the portable key device is stationary and has thus stopped.

In FIG. 2B, an acceleration estimate a is shown over time. The acceleration a is obtained using the motion sensor in the first portable key device 2a of FIG. 1. The acceleration a can e.g. be obtained from acceleration measurements from an accelerometer.

At time $t_0$, the there is a deceleration peak, followed by a period of zero acceleration, which can indicate that the portable key device is stopping at time $t_0$.

FIGS. 3A-D are schematic diagrams illustrating embodiments of where the positioning determiner 1 can be implemented. The positioning determiner 1 is used for determining when the portable key device has stopped, and positioning is to be triggered.

Figure 3A:
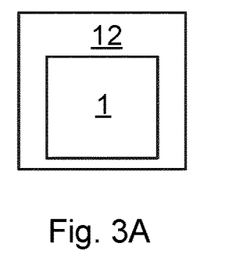
FIGS. 3A-D are schematic diagrams illustrating embodiments of where the positioning determiner can be implemented.

In FIG. 3A, the positioning determiner 1 is shown implemented in the electronic lock 12. The electronic lock 12 is thus the host device for the positioning determiner 1. Optionally, the positioning determiner 1 is implemented in a positioning module forming part of the electronic lock 12.

Figure 3B:
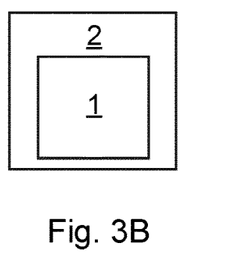

In FIG. 3B, the positioning determiner 1 is shown implemented in the portable key device 2. The portable key device 2 is thus the host device for the positioning determiner 1.

Figure 3C:
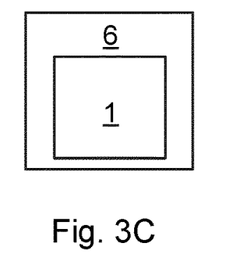

In FIG. 3C, the positioning determiner 1 is shown implemented in the server 6. The server 6 is thus the host device for the positioning determiner 1.

Figure 3D:
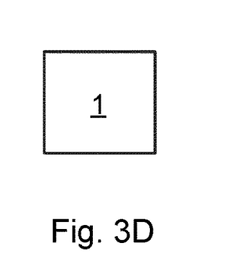

In FIG. 3D, the positioning determiner 1 is shown implemented as a stand-alone device.

Figure 4:
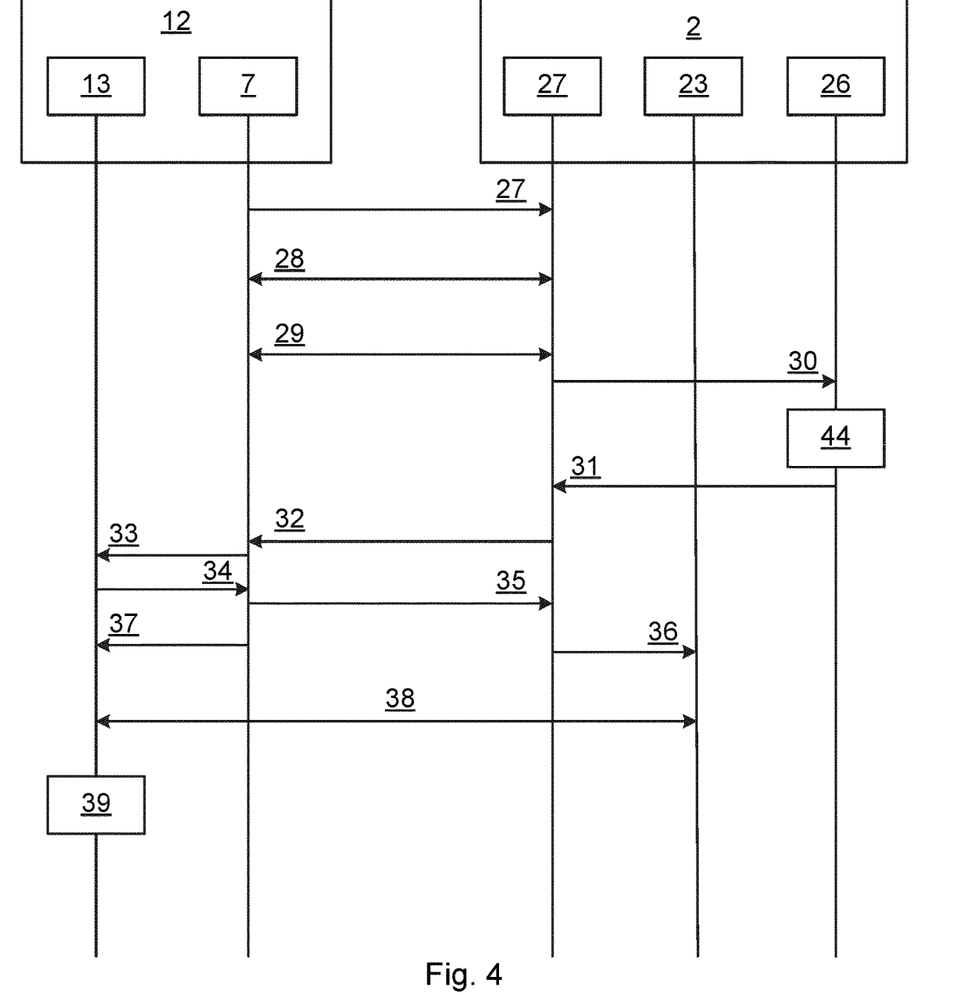
FIG. 4 is a sequence diagram illustrating communication between different entities of FIG. 1 for authentication, positioning and access control.

FIG. 4 is a sequence diagram illustrating communication between different entities of FIG. 1 for authentication, positioning and access control. It is here shown the communication between the electronic lock 12 and a portable key device 2, which can e.g. be any of the portable key devices of FIG. 1.

Within the electronic lock 12, a lock positioning module 13 is shown. Moreover, a lock wireless communication module 7 is also shown. Within the portable key device 2, a key positioning module 23 is shown. Moreover, a key wireless communication module 27 and a motion sensor 26 are shown. The wireless communication modules 7, 27 are based on an energy efficient local wireless communication, such as BLE. The positioning modules 13, 23 are based on a positioning technology which does not need to be as energy efficient, e.g. based on UWB, but provides sufficient accuracy for positioning a portable key device.

First, the lock communication module 7 advertises 27 its presence, which is detected by the key communication module 27. The lock communication module 7 and the key communication module 27 then connect 28 and authenticate 29 the portable key device 2, as known in the art per se.

According to embodiments presented herein, the motion sensor 26 is then triggered 30 to start detecting motion. At some point, a stop in motion is determined 44, as described in more detail below. It is to be noted that step 44 does not need to be performed in the portable key device 2 and can be performed in the positioning determiner 1 (see FIGS. 3A-D) but for ease or representation, in this example, the stop in motion is determined in (the positioning determiner 1 here forming part of) the portable key device 2.

Once the stop is determined, this is messaged 31 to the key communication module 27, which in turn messages 32 the stopped motion to the lock communication module 7. The lock communication module sends a command 33 to the lock positioning device 13 to initialise positioning, which responds 34 that positioning is to start using a specific parameter (e.g. a seed used in the positioning between the lock positioning device 13 and the key positioning module 23. It is to be noted that positioning does not occur until the stopped motion is determined. The lock communication module 7 transmits the parameter 35 to the key communication module 27 which provides the parameter 36 to the key positioning module 23 which also triggers the key positioning module 23 to assist in the positioning.

At this point, the lock positioning device 13 is triggered 37 to perform positioning, after which positioning 38 occurs.

If the portable key device 2 is determined to be in the accessible physical space 14 (on the outside), the electronic lock is set 39 in an unlocked state, allowing the user to enter. Optionally, the portable key device 2 also needs to be within a specific distance from the electronic lock, or within a specified region for the electronic lock to be set 39 in the unlocked state.

Figure 5:
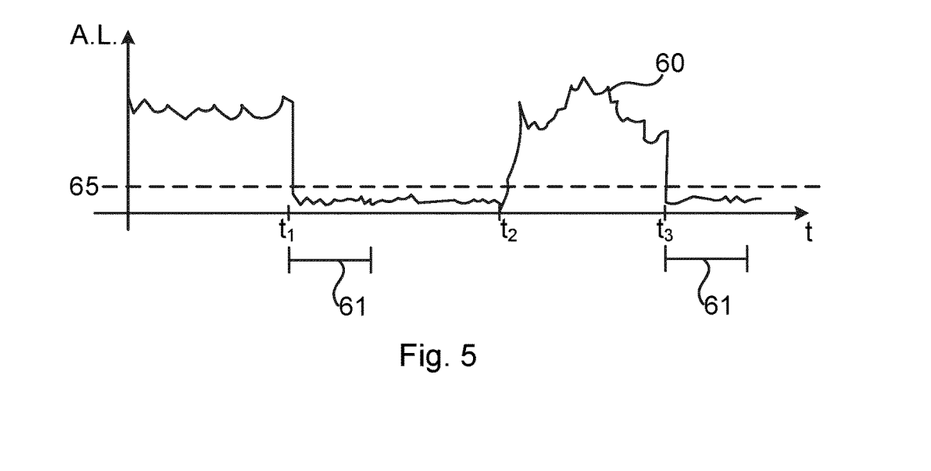
FIG. 5 is a schematic graph illustrating an example with activity level over time and when positioning is triggered.

FIG. 5 is a schematic graph illustrating an example with activity level 60 over time and when positioning is triggered. Activity level is any indicator of activity, e.g. based on acceleration. In one embodiment, activity level is derived from three-dimensional acceleration where the component along a gravitational axis is removed from the movement data. The magnitude (resultant) is then an activity level. Optionally, this magnitude is then passed through a low pass filter (e.g. sliding time window average) to reduce noise. In one embodiment, the activity level is calculated as the integrated value of a sliding time window (sum of the samples in the sliding window). Optionally, the activity level is formed by passing the magnitude through a peak-hold filter.

At a first point in time t1, the activity level 60 reduces to fall below an activity threshold 65. When the activity level falls below this threshold 65, the portable key device is considered to have stopped. Hence, positioning of the portable key device is triggered to occur. This continues for a certain time period 61 after which positioning is no longer active, to thereby save power.

At a second point in time t2, the user starts moving again, resulting in increased activity level 60.

At a third point in time t3, the activity level 60 reduces again, falling below the activity threshold 65, whereby the portable key device is considered to have stopped. Positioning of the portable key device is triggered to occur again for a certain time period 6i after which positioning is no longer active, to thereby save power.

Figures 6, 7, 8:
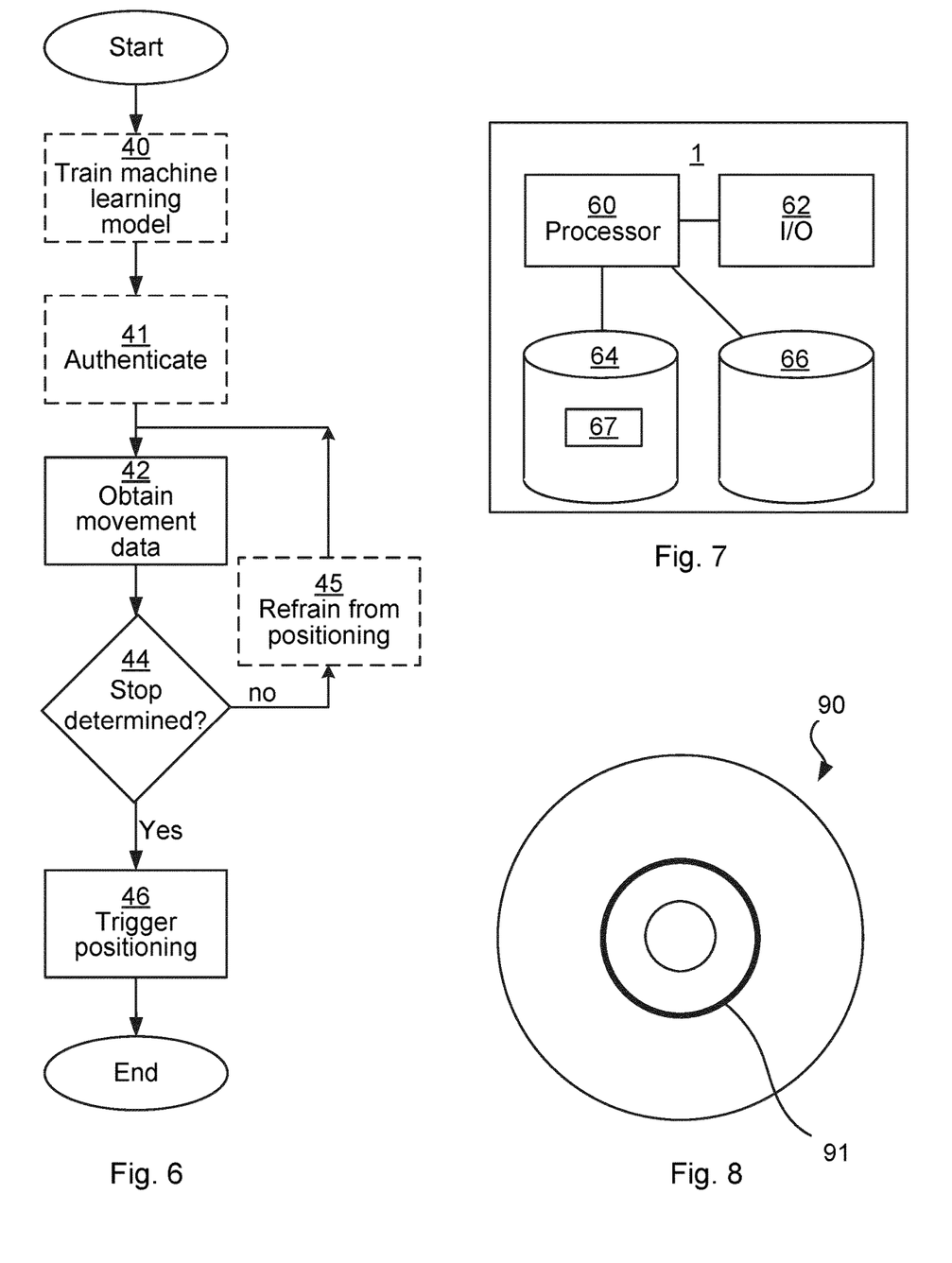
FIG. 6 is a flow chart illustrating embodiments of methods for determining when to trigger positioning of a portable key device.
FIG. 7 is a schematic diagram illustrating components of the positioning determiner of FIGS. 3A-D.
FIG. 8 shows one example of a computer program product comprising computer readable means.

FIG. 6 is a flow chart illustrating embodiments of methods for determining when to trigger positioning of a portable key device. As described above, the portable key device is used in access control by the electronic lock controlling access to a restricted physical space. The method is performed in the positioning determiner.

In an optional train machine learning model step 40, the positioning determiner trains a machine learning model based on movement data being input data, and stop in motion being expected output. In the training phase, the stop in motion can be implemented using a separate user input, allowing a user to indicate when the portable key device has actually stopped. The separate user input for indicating when the portable key device has stopped occurs is only used in the training phase. Optionally, the training the machine learning model can occur in a different device/devices than the positioning determiner. The training can occur long before the rest of the steps of the method.

In an optional authenticate step 41, the positioning determiner authenticates the portable key device with the electronic lock using a first communication protocol (e.g. BLE). Furthermore, authorisation (not shown) can occur at this stage to make the unlocking faster once that is to occur.

In an obtain movement data step 42, the positioning determiner obtains movement data from a motion sensor of a portable key device. When the positioning determiner is implemented in the portable key device (see FIG. 3B), this involves only internal communication. Otherwise, this step involves communication from the portable key device to the positioning determiner to thereby obtain the movement data. The movement data (captured by the motion sensor forming part of the portable key device) indicates movement of the portable key device. As described above, the movement data can be based on measurements from an accelerometer and/or gyro of (forming part of) the portable key device, in which case the motion sensor comprises the accelerometer and/or gyro.

Optionally, multiple sets of movement data covering a time period are obtained. This allows e.g. the velocity of FIG. 2A and/or the acceleration of FIG. 2B to be determined.

Optionally, movement can be based on the accelerometer where movement along a gravitational axis is removed from the movement data. The movement in the gravitational axis is often noisy (e.g. due to steps when a user is walking/running) and does not contribute much to the ability to determine when the portable key device stops. Optionally, the movement data is subsequently quantified as the magnitude of in a plane perpendicular to the gravitational axis.

In a conditional stopped step 44, the positioning determiner determines when the movement data indicates a stop in motion of the key device.

For instance, it can be determined that the movement data indicates a stop in motion when the movement data indicates a deceleration peak. Alternatively or additionally, it can be determined that the movement data indicates that velocity is about zero, i.e. zero within a fault tolerance. The fault tolerance can e.g. be 0.5 m/s or even 0.3 m/s.

In one embodiment, portable key device stop is determined based on the machine learning model. It has been found that machine learning is well suited for this stop determination and results in very few false negatives (i.e. missed occasions of detecting actual stop of the portable key device) and very few false positives (i.e. determined stop of the portable key device when there is no actual stop of the portable key device). In this case, the determination of stopped can be triggered when a transition from walking to still is detected.

When a stop is determined, the method proceeds to a trigger positioning step 46. Otherwise, the method returns to the obtain movement data step 42, optionally via a refrain from positioning step 45.

In the optional refrain from positioning step 45, the positioning determiner refrains from positioning the portable key device whenever the movement data fails to indicate a stop in motion of the key device. Consequently, positioning only occurs when the key device is still. In this way, energy consumption for the positioning is kept low, while still providing great responsiveness. This is better than polling of positioning, where it is difficult to find a balance of sufficiently responsiveness (requiring a high polling frequency) and energy efficiency (requiring a low polling frequency). Using embodiments presented herein, positioning only occurs when the key device is static, i.e. still. Compared to always determining the position of the key device, embodiments presented herein allow more accurate and energy consuming positioning technologies to be exploited while keeping total energy consumption low.

In the trigger positioning step 46, the positioning determiner triggers positioning of the portable key device to be performed. This can be implemented by sending an appropriate signal to the positioning module which is fixed in relation to the electronic lock, e.g. the positioning module 13 of FIG. 1. Optionally, positioning is triggered to occur repetitively during a fixed time period, e.g. for a certain number of seconds. After this time period, the positioning is stopped to reduce power used for the positioning.

The positioning can be based on communication over a second communication protocol (e.g. UWB) being different from the first communication protocol (e.g. BLE). The second communication protocol can be more energy demanding than the first communication protocol.

Optionally, the positioning is also triggered when a portable key device first comes into communication range of the first communication protocol. In this situation, the user is only just coming in the vicinity of the electronic lock, and it is likely that the user will approach the electronic lock to unlock and enter.

If a new stop is detected after the first step, there are a few alternative embodiments.

In one embodiment, activity level monitoring is obtained using only motion data. When the motion data indicates an activity level below a certain threshold, this is interpreted as a stop. Then, when the activity level increases above another higher threshold, the positioning is deactivated and the method is repeated. Alternatively, the positioning is deactivated and the method is repeated when a number of steps after the detected stop exceeds a threshold, i.e. the user is walking.

It is to be noted that embodiments presented herein can be applied for any situation where positioning of a mobile device occurs, especially when the positioning is resource demanding, such as UWB. In other words, the embodiments presented herein are not restricted to the situation of electronic locks and keys.

FIG. 7 is a schematic diagram illustrating components of the positioning determiner 1 of FIGS. 3A-D. It is to be noted that one or more of the mentioned components can be shared with the host device, when the positioning determiner forms part of a host device. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 6 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM. a The positioning determiner 1 further comprises an I/O interface 62 for communicating with other external entities. This includes the key wireless communication module and the key positioning module.

Other components of the positioning determiner 1 are omitted in order not to obscure the concepts presented herein.

FIG. 8 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A method for determining when to trigger positioning of a portable key device used in access control for an electronic lock controlling access to a restricted physical space, the method being performed in a positioning determiner and comprising the steps of:
  obtaining movement data from a motion sensor of the portable key device, the movement data indicating movement of the portable key device;
  determining when the movement data indicates a stop in motion of the key device; and triggering positioning of the portable key device when a stop in motion of the key device has been determined.

ii. The method according to embodiment i, further comprising the step, prior to the step of obtaining movement data, of:
authenticating the portable key device with the electronic lock using a first communication protocol.

iii. The method according to embodiment ii, wherein the positioning is based on communication over a second communication protocol, the second communication protocol being different from the first communication protocol.

iv. The method according to any one of the preceding embodiments, wherein the step of triggering positioning comprises triggering positioning to occur repetitively during a certain time period.

v. The method according to any one of the preceding embodiments, wherein the step of determining when the movement data indicates a stop in motion comprises determining the movement data indicating a stop in motion when an activity level, based on the movement data, falls below a threshold.

vi. The method according to any one of the preceding embodiments, further comprising the step, prior to the step of obtaining movement data, of:
training a machine learning model based on movement data being input data and stop in motion being expected output; and
wherein the step of determining when the movement data indicates a stop in motion is based on the machine learning model.

vii. The method according to any one of the preceding embodiments, wherein the step of determining when the movement data indicates a stop in motion comprises determining the movement data indicating a stop in motion when the movement data indicates that velocity is about zero.

viii. The method according to any one of the preceding embodiments, wherein the step of triggering positioning comprises triggering positioning using a positioning module being fixed in relation to the electronic lock.

ix. A positioning determiner for determining when to trigger positioning of a portable key device used in access control for an electronic lock controlling access to a restricted physical space, the positioning determiner comprising:
a processor; and
a memory storing instructions that, when executed by the processor, cause the positioning determiner to:
obtain movement data from a motion sensor of a portable key device, the movement data indicating movement of the portable key device;
determine when the movement data indicates a stop in motion of the key device; and
trigger positioning of the portable key device when a stop in motion of the key device has been determined.

x. The positioning determiner according to embodiment ix, further comprising instructions that, when executed by the processor prior to the instructions of obtaining movement data, cause the positioning determiner to:
authenticate the portable key device with the electronic lock using a first communication protocol.

xi. The positioning determiner according to embodiment x, wherein the positioning is based on communication over a second communication protocol, the second communication protocol being different from the first communication protocol.

xii. The positioning determiner according to any one of embodiments ix to xi, wherein the instructions to trigger positioning comprise instructions that, when executed by the processor, cause the positioning determiner to trigger positioning to occur repetitively during a certain time period.

xiii. The positioning determiner according to any one of embodiments ix to xii, wherein the instructions to determine when the movement data indicates a stop in motion comprise instructions that, when executed by the processor, cause the positioning determiner to determine the movement data indicating a stop in motion when an activity level, based on the movement data, falls below a threshold.

xiv. The positioning determiner according to any one of embodiments ix to xiii, further comprising instructions that, when executed by the processor prior to the instructions to obtain movement data, cause the positioning determiner to:
train a machine learning model based on movement data being input data and stop in motion being expected output; and
wherein the instructions to determine when the movement data indicates a stop in motion is based on the machine learning model.

xv. The positioning determiner according to any one of embodiments ix to xiv, wherein the instructions to determine when the movement data indicates a stop in motion comprise instructions that, when executed by the processor, cause the positioning determiner to determine the movement data indicating a stop in motion when the movement data indicates that velocity is about zero.

xvi. The positioning determiner according to any one of embodiments ix to xv, wherein the instructions to trigger positioning comprise instructions that, when executed by the processor, cause the positioning determiner to trigger positioning using a positioning module being fixed in relation to the electronic lock.

xvii. A computer program for determining when to trigger positioning of a portable key device used in access control for an electronic lock controlling access to a restricted physical space, the computer program comprising computer program code which, when run on a positioning determiner causes the positioning determiner to:
obtain movement data from a motion sensor of a portable key device, the movement data indicating movement of the portable key device;
determine when the movement data indicates a stop in motion of the key device; and
trigger positioning of the portable key device when a stop in motion of the key device has been determined.

xviii. A computer program product comprising a computer program according to embodiment xvii and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for determining when to trigger positioning of a portable key device used in access control for an electronic lock controlling access to a restricted physical space, the method being performed in a positioning determiner and comprising:
   obtaining movement data from a motion sensor of the portable key device, the movement data including at least one of acceleration data or velocity data, and indicating non-absolute movement of the portable key device;
   determining when the movement data indicates a stop in motion of the portable key device;
   triggering positioning of the portable key device when a stop in motion of the portable key device has been determined, the positioning indicating a position of the portable key device relative to the restricted physical space; and
   refraining from positioning the portable key device until the movement data indicates the stop in motion of the portable key device.

2. The method according to claim 1, further comprising:
   authenticating the portable key device with the electronic lock using a first communication protocol.

3. The method according to claim 2, wherein the positioning is based on communication over a second communication protocol, the second communication protocol being different from the first communication protocol.

4. The method according to claim 1, wherein triggering positioning comprises triggering positioning to occur repetitively during a certain time period.

5. The method according to claim 1, wherein determining when the movement data indicates a stop in motion comprises determining the movement data indicating a stop in motion when an activity level, based on the movement data, falls below a threshold.

6. The method according to claim 1, further comprising:
   training a machine learning model based on movement data being input data and stop in motion being expected output;
   wherein determining when the movement data indicates a stop in motion is based on the machine learning model.

7. The method according to claim 1, wherein determining when the movement data indicates a stop in motion comprises determining that the at least one of the acceleration data or the velocity data indicates that a velocity of the portable key device is about zero.

8. The method according to claim 1, wherein triggering positioning comprises triggering positioning using a positioning module being fixed in relation to the electronic lock.

9. A positioning determiner for determining when to trigger positioning of a portable key device used in access control for an electronic lock controlling access to a restricted physical space, the positioning determiner comprising:
   a processor; and
   a memory storing instructions that, when executed by the processor, cause the positioning determiner to:
      obtain movement data from a motion sensor of a portable key device, the movement data including at least one of acceleration data or velocity data, and indicating non-absolute movement of the portable key device;
      determine when the movement data indicates a stop in motion of the portable key device;
      trigger positioning of the portable key device when a stop in motion of the portable key device has been determined, the positioning indicating a position of the portable key device relative to the restricted physical space; and
      refrain from positioning the portable key device until the movement data indicates the stop in motion of the portable key device.

10. The positioning determiner according to claim 9, further comprising instructions that, when executed by the processor prior to the instructions of obtaining movement data, cause the positioning determiner to:
    authenticate the portable key device with the electronic lock using a first communication protocol.

11. The positioning determiner according to claim 10, wherein the positioning is based on communication over a second communication protocol, the second communication protocol being different from the first communication protocol.

12. The positioning determiner according to claim 9, wherein the instructions to trigger positioning comprise instructions that, when executed by the processor, cause the positioning determiner to trigger positioning to occur repetitively during a certain time period.

13. The positioning determiner according to claim 9, wherein the instructions to determine when the movement data indicates a stop in motion comprise instructions that, when executed by the processor, cause the positioning determiner to determine the movement data indicating a stop in motion when an activity level, based on the movement data, falls below a threshold.

14. The positioning determiner according to claim 9, further comprising instructions that, when executed by the processor, cause the positioning determiner to:
    train a machine learning model based on movement data being input data and stop in motion being expected output;
    wherein the instructions to determine when the movement data indicates a stop in motion is based on the machine learning model.

15. The positioning determiner according to claim 9, wherein the instructions to determine when the movement data indicates a stop in motion comprise instructions that, when executed by the processor, cause the positioning determiner to determine that the at least one of the acceleration data or the velocity data indicates that a velocity of the portable key device is about zero.

16. The positioning determiner according to claim 9, wherein the instructions to trigger positioning comprise instructions that, when executed by the processor, cause the positioning determiner to trigger positioning using a positioning module being fixed in relation to the electronic lock.

17. A non-transitory computer readable medium storing a computer program for determining when to trigger positioning of a portable key device used in access control for an electronic lock controlling access to a restricted physical space, the computer program comprising computer program code which, when run on a positioning determiner causes the positioning determiner to:
    obtain movement data from a motion sensor of a portable key device, the movement data including at least one of acceleration data or velocity data, and indicating non-absolute movement of the portable key device;
    determine when the movement data indicates a stop in motion of the portable key device;
    trigger positioning of the portable key device when a stop in motion of the portable key device has been determined, the positioning indicating a position of the portable key device relative to the restricted physical space; and refrain from positioning the portable key device until the movement data indicates the stop in motion of the portable key device.

\* \* \* \* \*